United States Patent
Antoszkiewicz

(10) Patent No.: US 6,172,490 B1
(45) Date of Patent: Jan. 9, 2001

(54) PRECISE RAIL TRACKING METHOD FOR POWERING DUAL VOLTAGE INTEGRATED CIRCUITS

(75) Inventor: Wojciech Antoszkiewicz, Kanata (CA)

(73) Assignee: Alcatel Networks Corporation, Kanata (CA)

( * ) Notice: Under 35 U.S.C. 154(b), the term of this patent shall be extended for 0 days.

(21) Appl. No.: 09/456,392

(22) Filed: Dec. 8, 1999

(51) Int. Cl.[7] .............. G05F 1/577; G05F 1/40; G05F 1/44
(52) U.S. Cl. .............. 323/267; 323/269; 323/274
(58) Field of Search .............. 323/267, 269, 323/273, 274

(56) References Cited

U.S. PATENT DOCUMENTS

| 4,087,759 | * | 5/1978 | Iwamatsu | 330/262 |
| 4,472,687 | * | 9/1984 | Kashiwagi et al. | 330/297 |
| 5,200,711 | * | 4/1993 | Anderson et al. | 330/267 |
| 5,543,753 | * | 8/1996 | Williamson | 330/297 |
| 5,606,289 | * | 2/1997 | Williamson | 330/297 |
| 5,898,340 | * | 4/1999 | Chatterjee et al. | 330/351 |
| 6,011,382 | * | 1/2000 | Littlefield et al. | 323/222 |

OTHER PUBLICATIONS

Power Trends, Inc. application note entitled: "Integrated Switching Regulators, DC to DC Converters".

* cited by examiner

Primary Examiner—Peter S. Wong
Assistant Examiner—Bao Q. Vu
(74) Attorney, Agent, or Firm—Marks & Clerk

(57) ABSTRACT

A rail tracking system and method for providing precise tracking of voltage levels to a dual supply voltage Integrated Circuit. A switch mode DC—DC voltage regulator is used to derive the lower of the two voltage levels from the higher level. The switch mode regulator employs a pulse width modulator (PWM) to derive the lower voltage level. A separate supply source is utilized to power the PWM and the timing of the supply voltage is such that the PWM has reached steady state before the higher voltage level is provided to the regulator.

10 Claims, 3 Drawing Sheets

US 6,172,490 B1

PRECISE RAIL TRACKING METHOD FOR POWERING DUAL VOLTAGE INTEGRATED CIRCUITS

FIELD OF THE INVENTION

This invention relates to integrated circuits having dual supply voltage requirements and, more particularly, to a system and method for accurately controlling the dual supply voltage levels.

BACKGROUND OF THE INVENTION

Many large scale integrated circuits contain multiple components providing different functionality and require two different supply voltage levels to operate. One such integrated circuit would include, for example, a core processor and input/output functions on the same silicon substrate, but operating from two different voltage levels. During startup, steady state, shut down and under fault conditions, the interaction between these voltages must meet strict requirements to ensure proper operation and to prevent damage to the integrated circuit. The techniques used to ensure proper interaction of these voltage levels all fall under the class of methods known as "Rail Tracking".

In a dual supply voltage mode scenario, typically, the larger of the two voltage rails will supply the input/output function, and the smaller of the two is used to power the core processor. The larger of the two voltage levels is supplied to the input/output functionality of the integrated circuit, and to a voltage regulator which derives the second or lower voltage level for use in powering the core processor.

The task of the voltage regulator consists of keeping the voltage on the output constant in a defined output range. One form of voltage regulator comprises a switch mode power supply. A switch mode power supply usually comprises a pulse width modulator (PWM), a power switch, a rectifier and an output filter. The pulse width modulator controls the power switch which converts an input voltage into pulsed DC voltage with variable duty cycle which in effect maintains constant voltage on the output of the filter circuit. In conventional voltage regulator voltage to power the PWM circuit is derived from the regulator's input voltage.

Because the PWM circuit requires a finite period to achieve steady state conditions there is an initial period between the time that the voltage is supplied to the regulator input and the time in which the output is fixed at the second voltage level. During this time the voltage difference between the input/output voltage and output core voltage may exceed maximum allowable limits causing damage to the integrated circuit.

A prior art method dealing with this problem is disclosed in Power Trends application note PT5000/6000 SIP Series (Integrated Switching Regulators DC—DC Converters). In this prior art solution, the voltage regulator is bypassed by a number of series connected diodes and a small resistor which are connected between the input/output voltage level and the core processor voltage. The series-connected diodes limit the difference between the two voltage levels as will be discussed in greater detail hereinafter.

There are shortcomings to this prior art method which render it unacceptable in certain circumstances. For example, as the steady state difference between the input/output voltage and the core processor voltage approaches the maximum allowable voltage difference, the tolerance on the diode voltage drop becomes critical. This tolerance is difficult to control inasmuch as the voltage drop across the diode junction is highly current and temperature dependent. Additionally, the tracking voltage difference can be set only with the resolution of each single junction voltage drop which typically equals approximately 0.6 volts or 0.3 volts for Schottky technology. Additionally, the series-connected diodes bypassing the voltage regulator negate any overcurrent protection provided by the voltage regulator. In addition, the diodes themselves can be easily damaged if the regulator fails as all of the current associated with the second voltage level will now flow through the diodes.

SUMMARY OF THE INVENTION

Accordingly, there is a requirement for an improved rail tracking system and method for powering a dual voltage integrated circuit.

Therefore, in accordance with a first aspect of the present invention there is provided a rail tracking method for providing dual voltages levels to first and second voltage rails on an integrated circuit (IC) comprising: providing a first voltage to the first voltage rail; providing the first voltage to a voltage regulator having conversion means to derive a second voltage for the second voltage rail; and providing a supply voltage to the conversion means whereby the supply voltage is provided before the first voltage is provided to the voltage regulator.

In accordance with a second aspect of the present invention there is provided a system for providing rail tracking of dual voltage levels to first and second voltage rails on an integrated circuit comprising: first voltage means to supply a first voltage level to the first voltage rail; a voltage regulator having means to receive the first voltage level; conversion means in the voltage regulator to derive a second voltage level for the second voltage rail from the first voltage level; and a supply voltage means to supply a supply voltage to the conversion means wherein the supply voltage is supplied to the conversion means before the first voltage is supplied to the voltage regulator.

BRIEF DESCRIPTION OF THE DRAWINGS

The invention will now be described in greater detail with reference to the attached drawings wherein.

DETAILED DESCRIPTION OF THE INVENTION

Figure 1:
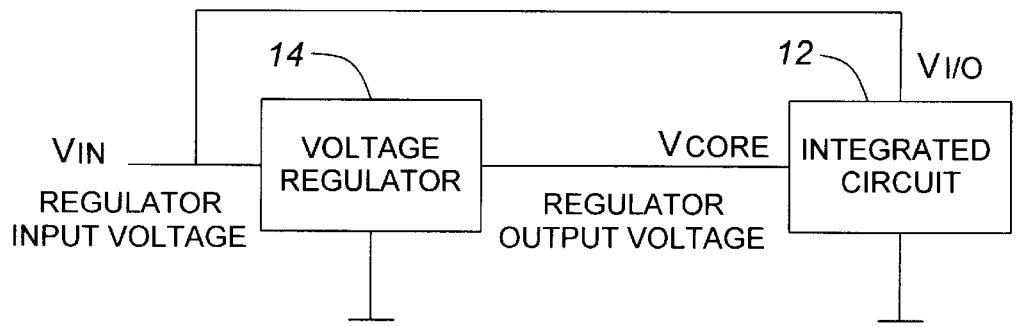
FIG. 1 is a typical power circuit for dual voltage integrated circuits.

FIG. 1 illustrates a typical power circuit for a dual voltage integrated circuit. Integrated circuit 12, which according to the present invention has a requirement for dual supply voltage levels, namely, a first voltage level for the input/output voltage (Vi/o) and a second voltage level for the core processor (Vcore). As discussed previously Vi/o is at a higher voltage level than Vcore. An input voltage (Vin) is provided by a power supply (not shown) to Vi/o and to the input of a voltage regulator 14. Voltage regulator 14 derives the Vcore voltage level from Vin. Typically, voltage regulator 14 employs switch mode topology to achieve the voltage conversion. The key element of the switch mode topology is a pulse width modulator as discussed previously. The key aspect, however, is that the voltage regulator output voltage reaches its steady state value, i.e. Vcore, only after initial stabilizing period has passed. As noted previously, during this stabilizing period, the voltage difference between the input/output voltage and the output core voltage may exceed maximum allowable limits causing damage to the integrated circuit.

Figure 2:
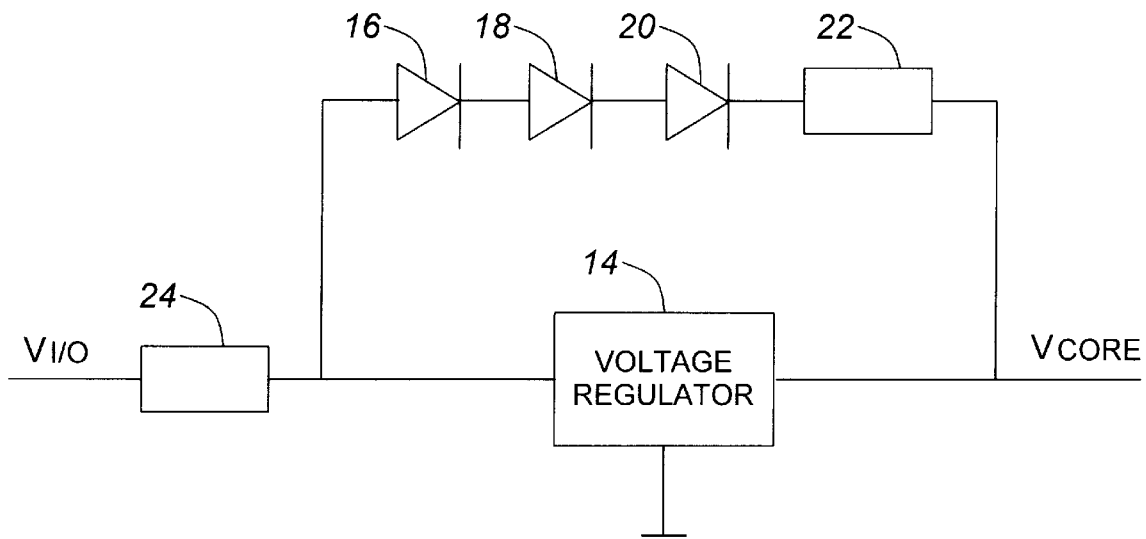
FIG. 2 is a diode rail tracking circuit according to the prior art.

The prior art solution to this problem is illustrated in FIG. 2 wherein voltage regulator 14 is bypassed by series-connected diodes 16, 18 and 20, and resistor 22. Typically, fuse 24, will protect the voltage regulator and downstream components.

According to the prior art method, the series-connected diodes are selected to provide a voltage drop across the voltage regulator such that the voltage difference between the input and at the core cannot exceed the maximum specified value. In FIG. 2, diodes 16, 18 and 20, limit the difference between Vi/o and Vcore. As discussed previously, there are shortcomings to the method illustrated in FIG. 2 which limits practical implementations of the concept.

Figure 3:
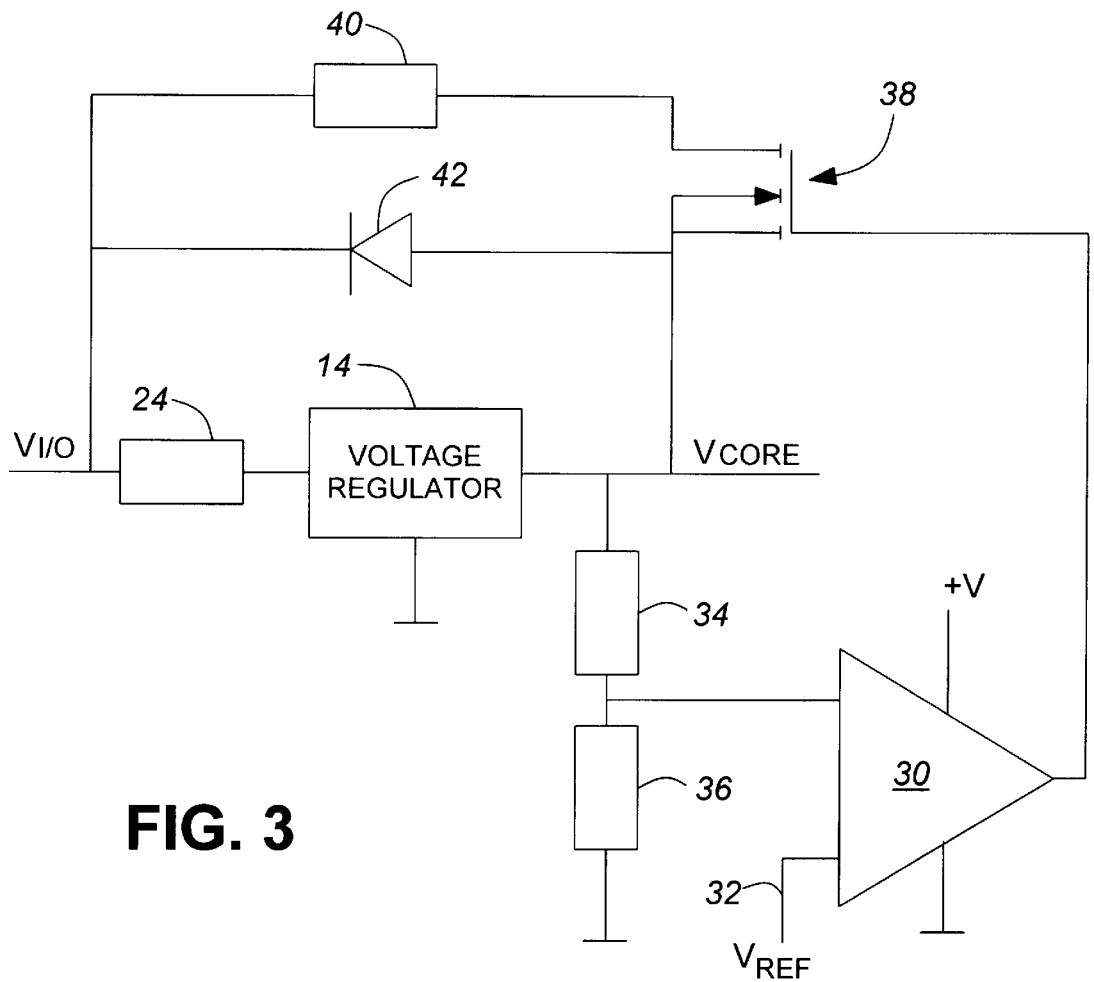
FIG. 3 is a linear series pass regulator rail tracking circuit.

A rail tracking method developed by Newbridge Networks Corporation uses a linear series pass regulator connected between the input Vi/o and the output Vcore of the regulator. This method has proven to be effective when high precision tracking (1.6V maximum difference between Vi/o and Vcore, while the normal operation difference is only 1.3V) is required with high currents (6 to 20A). A circuit illustrating this rail tracking method is shown in FIG. 3. Operational amplifier 30 controls power transistor 38 which, in turn, provides Vcore during the time it takes regulator 14 to startup. During the initial period, operational amplifier 30 is controlled by V reference 32 until the output across voltage divider 34/36 reaches the steady state value. Resistor 40 reduces power dissipation in transistor 38, and diode 42 provides backward tracking during turnoff. An additional voltage monitoring network, (not shown) is required to protect resistor 40 and transistor 38 in the case of a failure of the regulator 14.

Although the rail tracking method shown in FIG. 3 is effective, multiple, real estate consuming, power components are required in addition to the standard regulator.

Regulator 14 in the prior art and in the embodiment of FIG. 3 typically employs a switch mode topology to achieve voltage conversion. The key element of this topology is the pulse width modulator (PWM) as previously discussed. The regulator will only produce the required output voltage after the PWM is operational. As discussed previously, the supply voltage for the PWM is derived from the regulator input voltage. Accordingly, there is an inherent delay between the voltage being applied to the regulator input and the PWM being operational. This accounts for the delay between Vi/o and Vcore.

Figure 4:
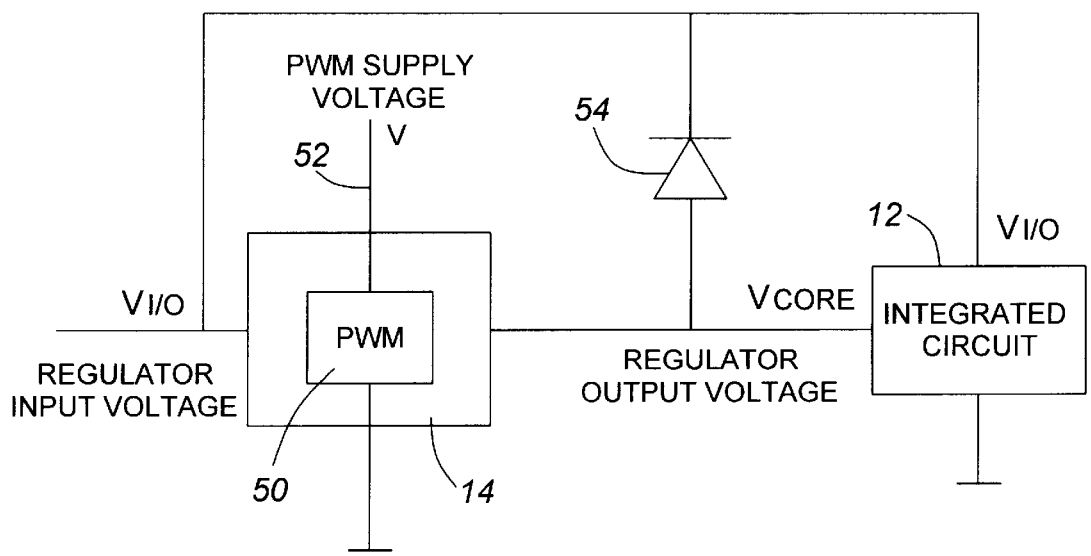
FIG. 4 is a circuit diagram of a precise rail tracking methodology according to the present invention.

The preferred embodiment of the present invention is illustrated in the circuit diagram of FIG. 4. The basis of this invention relies on the PWM power supply being connected prior to the regulator input voltage being applied. As a result, the regulator output voltage will track, with no delay, the regulator input voltage. This ensures true tracking between regulator input and output voltages which correspond to the true tracking between Vi/o and Vcore.

As shown in FIG. 4, voltage regulator 14 includes pulse width modulator 50, which is supplied by supply voltage through input 52. In accordance with the basic concept of the invention, supply voltage is provided through input 52 prior to Vi/o being supplied to the regulator. In this way, the pulse width modulator has reached steady state condition before Vi/o is supplied and hence, the regulator output voltage (Vcore) will precisely track the regulator input voltage. As shown in FIG. 4, the PWM supply voltage is an external voltage not necessarily related to the regulator input voltage.

The Schottky diode 54 provides backward tracking during turnoff. An additional voltage monitoring network (not shown) may be used to protect the integrated circuit in case of failure of the regulator.

The tracking method provided by the embodiment of FIG. 4 offers the following benefits over those previously described. First, this method provides precise rail tracking inasmuch as the pulse width modulator is fully operational before the regulator input voltage is supplied. Secondly, no additional power components are required which results in lower board space, lower cost of the design, and increased reliability. Further, the regulator current limit is not bypassed as was the case in the prior art method.

Figure 5:
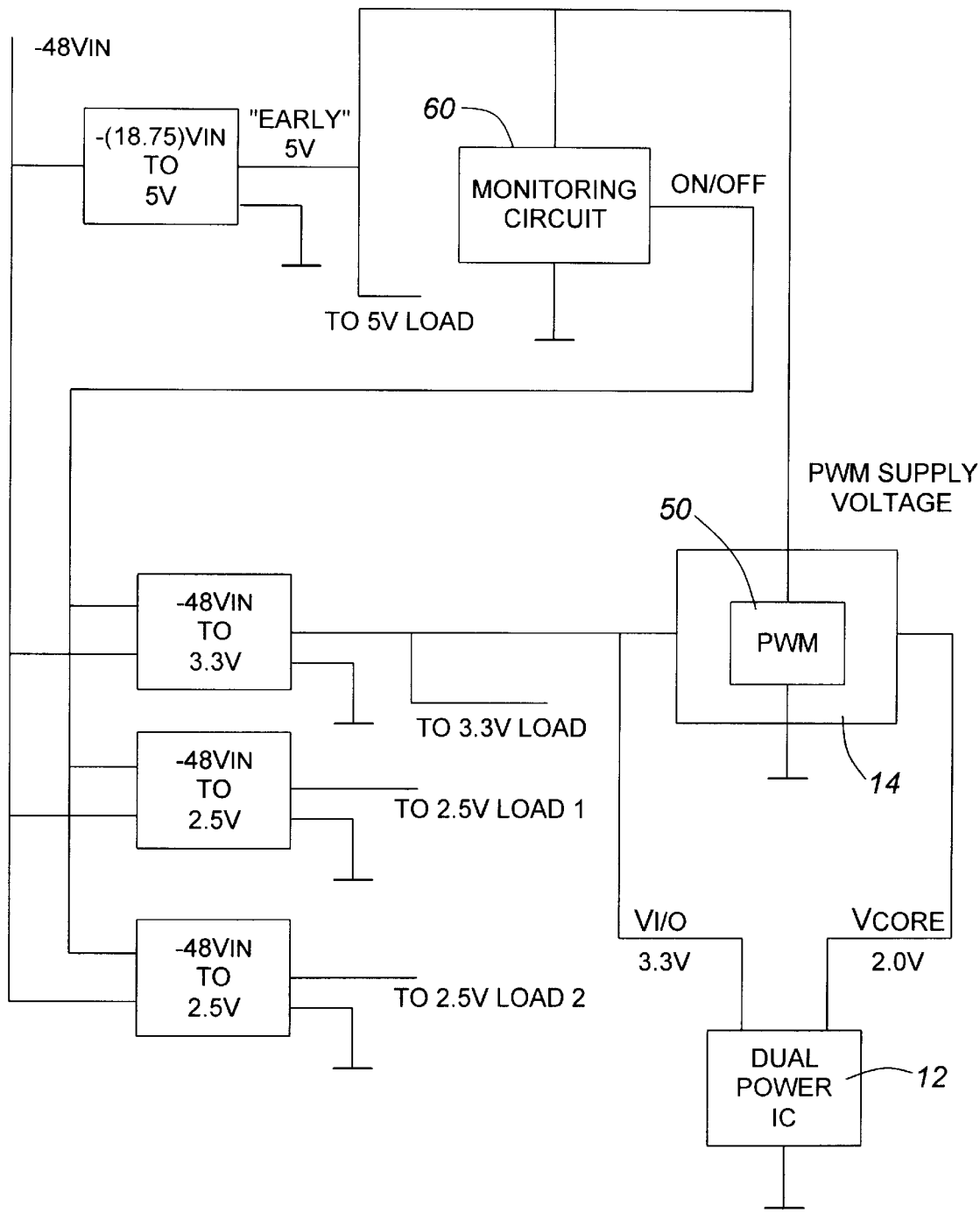
FIG. 5 is an example of a block diagram of a practical implementation of the tracking method according to the present invention.

The block diagram of FIG. 5 shows an example of a practical application of the tracking method of the present invention as implemented in a practical design.

Four isolated DC—DC converters are used to provide power to the system. Three of these converters (3.3V and 2×2.5V outputs) are standard modules which operate in the input voltage range 36 to 75V. The fourth one, the 5V output, operates over a wide input range 18 to 75V, and is designed to start faster than the remaining three major converters.

The main function of the +5V converter is to provide early supply voltage for the monitoring circuit 60 which, via On/Off pins controls the major converters. As shown, the early 5V converter is not part of the On/Off loop. The rail tracking in the system is required between the 3.3V and 2.5V rails and between the 3.3V Vi/o and 2.0V Vcore for the dual power IC. Tracking between high current rails (3.3V/60A and 2.5V/20A) has been provided using the linear series pass regulator circuit as illustrated in FIG. 3. The tracking method according to the preferred embodiment of FIG. 4 is used for providing tracking between the 3.3V and 2.0V rail for the dual power IC. The 3.3V to 2.0V module is a non-isolated, DC—DC switch mode power supply. According to the preferred embodiment of the invention, the pin to supply the supply voltage to the pulse width modulator is isolated in order that voltage from the early 5V supply can be connected directly to the pulse width modulator.

Although example embodiments of the invention have been disclosed and illustrated, it will be apparent to one skilled in the art that variation to the basic concept can be implemented. Particularly the input/output and core voltage levels and the DC—DC module type may be different. It is to be understood, however, that such variations will fall within the true scope of the invention as defined by the appended claims.

What is claimed is:

1. A rail tracking method for providing dual voltage levels to first and second voltage rails on an integrated circuit (IC) comprising:

providing a first voltage to said first voltage rail;

providing said first voltage to a voltage regulator having conversion means to derive a second voltage for said second voltage rail; and providing a supply voltage to said conversion means whereby said supply voltage is provided before said first voltage is provided to said voltage regulator.

2. The method according to claim 1 wherein said conversion means uses a pulse width modulator (PWM) to derive said second voltage from said first voltage.

3. A system for providing rail tracking of dual voltage levels to first and second voltage rails on an integrated circuit (IC) comprising:

first voltage means to supply a first voltage level to said first voltage rail;

a voltage regulator having means to receive said first voltage level; conversion means in said voltage regulator to derive a second voltage level for said second voltage rail from said first voltage level; and a supply voltage means to supply a supply voltage to said conversion means wherein said supply voltage is supplied to said conversion means before said first voltage is supplied to said voltage regulator.

4. A system as defined in claim 3 wherein said conversion means includes a pulse width modulator (PWM).

5. A system as defined in claim 4 further including a backward tracking diode between said second voltage rail and said first voltage rail.

6. A system as defined in claim 5 wherein said first voltage level supplies input/output functions on said IC and said second voltage level powers a core processor on said IC.

7. A system as defined in claim 6 wherein said supply voltage is supplied by a DC—DC switch-mode power supply.

8. A system for providing rail tracking to an Integrated Circuit (IC) wherein said IC performs multiple functions requiring dual operating voltage levels; said system comprising:

a first DC—DC power supply to supply a first voltage level to said IC;

a voltage regulator circuit employing a switch mode converter to receive said first voltage level and to derive therefrom a second voltage level for said IC; and a second DC—DC power supply to supply operating voltage to said switch mode converter;

whereby said second DC—DC power supply supplies said operating voltage to said switch mode converter such that said converter is operational before said first voltage level to derive said second voltage level is supplied to voltage regulator circuit.

9. A system as defined in claim 8 wherein said switch mode converter employs a pulse width modulator to derive said second voltage level.

10. A system as defined in claim 8 wherein said voltage regulator circuit has a separate connection for receiving said supply voltage.

* * * * *